United States Patent [19]

Curnutt

[11] Patent Number: 5,190,126

[45] Date of Patent: Mar. 2, 1993

[54] SHOCK ABSORBER WITH AIR CAVITY CONTROLLED ORIFICES

[76] Inventor: Charles Curnutt, 75992 Baseline, Twenty Nine Palms, Calif. 92277

[21] Appl. No.: 760,884

[22] Filed: Sep. 16, 1991

[51] Int. Cl.[5] ............................. F16F 9/06; F16F 9/34
[52] U.S. Cl. .................................... 188/269; 188/282; 188/285; 188/299; 188/317; 267/64.15; 267/127
[58] Field of Search ............... 188/269, 284, 282, 285, 188/314, 317, 322.15, 280, 299; 267/64.15, 127

[56] References Cited

U.S. PATENT DOCUMENTS

| 2,244,501 | 6/1941 | Pierce | 188/284 |
| 2,357,278 | 8/1944 | O'Connor | 188/269 |
| 3,990,687 | 11/1976 | Curnutt . | |
| 4,210,344 | 7/1980 | Curnutt . | |
| 4,245,854 | 1/1981 | Curnutt . | |
| 4,683,992 | 8/1987 | Watanabe | 188/299 |
| 4,749,068 | 6/1988 | Sirven | 188/322.15 X |
| 4,972,928 | 11/1990 | Sirven | 188/269 |

FOREIGN PATENT DOCUMENTS

| 2312925 | 12/1976 | France | 188/322.15 |
| 2071807 | 9/1981 | United Kingdom | 188/280 |

Primary Examiner—George E. A. Halvosa
Attorney, Agent, or Firm—Charles H. Thomas

[57] ABSTRACT

A shock absorber is constructed with a hollow cylinder within which a first piston is disposed to move coaxially. A well is defined within the first piston to receive a second piston. The first piston is also provided with longitudinally extending dampening passageways and relief passageways. A cavity of variable volume filled with a compressible fluid, such as air, is defined between the two cylinders. At the start of a stroke of movement of the first piston within the cylinder, the additional length of the piston rod which enters the cylinder as the first piston moves toward the blind end of the cylinder increases pressure on the compressible fluid within the cylinder. The second piston is thereby pressed further into the first piston and ultimately closes off the dampening passageways, thereby preventing further movement of the first piston and increasing the dampening characteristics of the shock absorber. Upon return of the first piston, the compressed air is allowed to expand and as the length of the piston rod that remains within the cylinder decreases, the dampening characteristics of the shock absorber increase.

17 Claims, 4 Drawing Sheets

SHOCK ABSORBER WITH AIR CAVITY CONTROLLED ORIFICES

BACKGROUND OF THE INVENTION

1. Field of the Invention

The present invention relates to a shock absorber in which the dampening effects are regulated by control of the flow of an incompressible fluid through internal orifices by means of a compressible fluid in an internal cavity.

2. Description of the Prior Art

Shock absorbers have long been employed for use in automotive vehicles to dampen the effects of spring action in a vehicle during cornering and in traveling over uneven surfaces. Conventional shock absorbers employ a hollow cylinder and a piston on a piston rod that moves within the cylinder. The cylinder is filled with an incompressible fluid, such as hydraulic fluid. The piston is formed with one or more longitudinal orifices which permit the passage of the hydraulic fluid at a controlled flow rate governed by the orifice size and viscosity of the hydraulic fluid. Either the piston rod or the cylinder is connected to the vehicle chassis and the other member is connected to the vehicle passenger compartment frame.

When the vehicle turns sharply or travels over an uneven roadway, the piston will move reciprocally within the cylinder at a rate controlled by the viscosity of the fluid and the sizes of the orifices, as longitudinal movement of the piston relative to the cylinder can only occur when hydraulic fluid is displaced from the portion of the cylinder toward which the piston is moving. Hydraulic fluid is substantially incompressible and can only be displaced by the passage of the hydraulic fluid through the longitudinal orifices to the opposite side of the piston in the cylinder. The stiffness or vibration dampening characteristics of the shock absorber are thus uniform throughout the range of movement of the piston relative to the cylinder, since the sizes of the orifices is fixed and the viscosity of the hydraulic fluid does not vary significantly during operation of the shock absorber.

SUMMARY OF THE INVENTION

The present invention is an improved shock absorber which has dampening characteristics that vary depending upon the position of the piston within a shock absorber cylinder. The controlled variability of the dampening characteristics is achieved by constructing the shock absorber with one or more pockets or cavities which contain a compressible fluid, such as air, and which vary in size depending upon the position of the piston within the cylinder. In one embodiment of the invention, the dampening characteristics of the shock absorber are relatively light when the piston is remote from the blind end of the cylinder. As the piston moves toward the blind end of the cylinder the volume of the cavity or cavities occupied by the compressible fluid is reduced, thereby increasing the pressure of the compressible fluid in those cavities. This stiffens or increases the dampening effect produced by the shock absorber.

In an optional embodiment of the invention the dampening characteristics are subject to operator control. Specifically, a passageway may be provided to the interior of the shock absorber piston or cylinder to provide a flow path of communication to the compressible fluid cavity located therewithin. In this way compressible fluid may be forced into the cavity containing the compressible fluid, or withdrawn from that cavity to selectively increase or decrease the resistance to piston movement by varying the pressure of the compressible fluid in the cavity. To decrease the dampening characteristics additional compressed fluid is forced into the variable volume cavity for the compressible fluid. To increase the dampening characteristics, some of the compressible fluid within the compressible fluid cavity is withdrawn. This selective control can be performed either through the manual manipulation of valves, or automatically subject to predetermined conditions.

In one broad aspect the present invention may be considered to be a shock absorber comprising a tubular cylinder having a blind end and an opposite end. A piston rod is disposed coaxially within the cylinder and protrudes axially from the opposite end thereof. A first piston is secured to the piston rod within the cylinder and is moveable in longitudinal reciprocation in sliding, fluid tight sealed engagement against the cylinder. The first piston defines separate dampening passageway means and return passageway means extending longitudinally therethrough. The first piston and the piston rod define therebetween an annular well facing the opposite end of the cylinder.

A return passage closure means is mounted on the first piston to alternatively block and unblock the return passageway means. A second piston has an annular configuration and is mounted for longitudinal reciprocation in the well in a sliding, fluid tight, sealed engagement with both the piston rod and the first cylinder to positions alternatively blocking and unblocking the dampening passageway means. The first and second pistons together define a cavity of variable volume therebetween. An annular end closure means is disposed across the opposite end of the cylinder and has a central opening with a seal to receive the piston rod in sliding, fluid tight, sealed engagement therewith. A compressible fluid is located in the cavity of variable volume. To provide ease of movement of the piston there may also be compressible fluid in the cylinder adjacent the end closure means between the second piston and the end closure means. An incompressible fluid occupies the remaining volume of the cylinder.

In the operation of one embodiment of the shock absorber of the invention the dampening characteristics are relatively low when the first piston is located near the annular end closure. As the piston rod pushes the first piston deeper toward the blind end of the cylinder, the increasing finite volume of space occupied by the increasing length of the piston rod entering the cylinder reduces the volume within the cylinder that is available for occupancy by the compressible fluid. Since the incompressible fluid in the cylinder cannot vary in volume, it responds to the increasing pressure by pressing the second piston further into the first, thereby reducing the volume of the cavity of variable volume between the first and second pistons. Ultimately, the second piston is brought into a position where it blocks the dampening passageways at their orifices through which the incompressible fluid flows. When this occurs the dampening characteristics of the shock absorber are substantially increased.

Thereafter, once an upward pressure is exerted on the piston rod, incompressible fluid can flow through the return passageways in the first cylinder from the end of the cylinder from which the piston rod protrudes toward the blind end of the cylinder. An outward force on the piston rod causes the incompressible fluid to start to flow through the return passages toward the blind end of the cylinder, thereby unseating the return passage closure member. As the first piston moves away from the blind end of the cylinder, the force of both pistons acting on the incompressible fluid in the portion of the cylinder between the first piston and the end of the cylinder through which the piston rod protrudes forces incompressible fluid into the return passageways. The pressure of this fluid traveling through the return passageways acts against the return passage closure means to unblock the return passageways. The return passageways thereby serve as relief channels which allow the first piston to move away from the blind end of the cylinder by providing channels through which incompressible hydraulic fluid can flow. This fluid flows through passageways in the first piston as the first piston moves away from the blind end and toward the opposite end of the cylinder.

As the first piston returns from the blind end to the opposite end of the cylinder, the volume within the cylinder occupied by the piston rod decreases, since the length of the portion of the piston rod remaining in the cylinder diminishes as the first piston travels away from the blind end of the cylinder. This reduces the pressure exerted by the incompressible fluid on the compressible fluid in the cavity of variable volume between the two pistons. This compressible fluid then expands, thereby reducing the stiffness or dampening effect of the shock absorber as the first piston returns to a position proximate to the annular end closure at the opposite end of the cylinder.

The dampening effect of the shock absorber is greatest when the first piston is forced furthest into the cylinder proximate to the blind end thereof, and least at the point at which the first piston is in closest proximity to the opposite end of the cylinder. The shock absorber of the invention thereby provides variable dampening depending upon the position of the first piston in its stroke within the cylinder.

Preferably the shock absorber is provided with a spring located in the cavity of variable volume between the first and second pistons when there is a space limitation on the size of the cavity of variable volume. The spring biases the pistons longitudinally apart, thereby aiding the force of the compressible fluid in the cavity of variable volume. When the first piston reaches the bottom of its stroke and approaches the blind end of the cylinder, and the force of a spring external to the shock absorber initiates a return stroke, the spring within the cavity between the pistons enhances the pressure which the second piston exerts on the incompressible fluid in the portion of the cylinder between the second piston and the opposite end of the cylinder through which the piston rod protrudes.

The return passage closure means is preferably formed of a plate disposed across the face of the first piston nearest the blind end of the cylinder. The return passage closure plate is mounted on the first piston by longitudinally extending guideposts. The return passage closure plate has openings therethrough which reside in registration with the lower orifice openings in the dampening passageways so that the return passage closure plate does not affect flow through the dampening passageways in any position. However, when the return passage closure plate is pressed flush against the face of the first piston that is directed toward the blind end of the cylinder, it cuts off the flow of incompressible fluid through the return passageways. Preferably, the guideposts are provided with springs that bias the return passage closure plate against the face of the first piston to block the return passageways.

In an optional embodiment of the invention the shock absorber is provided with a means for controlling the dampening characteristics externally of the shock absorber mechanism. This may be done by providing a piston rod with a hollow, longitudinal passageway defined therewithin. The passageway preferably extends axially along the center of the piston rod and has a lateral opening therefrom in communication with the cavity of variable volume defined between the first and second pistons.

Also, a compressible fluid reservoir is located externally of the cylinder and in communication with the longitudinal passageway in the piston rod. A pressure regulating means, such as a valve, is located between the longitudinal passage in the piston rod and the compressible fluid reservoir. This allows compressible fluid to be forced into or withdrawn from the cavity of variable volume defined between the two pistons to change the dampening characteristics of the shock absorber.

In certain situations, for example in high speed automotive racing vehicles, it may be desirable to provide the vehicle operator with the capability for selectively controlling the dampening characteristics by operating the valve between the compressible fluid reservoir and the longitudinal passageway in the piston rod. The valve may be operated to connect the high pressure compressible fluid reservoir to the longitudinal passageway to force additional compressible fluid into the cavity between the two pistons. The valve may also be operated to vent the pressurized compressible fluid from the cavity between the two pistons to atmosphere or some other low pressure reservoir. The valve may alternatively be closed completely, thus allowing the shock absorber to function independently of any external controls.

The shock absorber may also be provided with an incompressible fluid reservoir located external to the cylinder and coupled in communication with the interior of the cylinder. A valve between the incompressible fluid reservoir and the cylinder can be employed to permit the quantity of incompressible fluid within the cylinder to be increased or decreased to increase or decrease the dampening effects of the cylinder. This provides a further degree of optional external control of the dampening characteristics of the shock absorber of the invention.

The invention may be described with greater clarity and particularity with reference to the accompanying drawings.

DESCRIPTION OF THE EMBODIMENT

Figure 1:
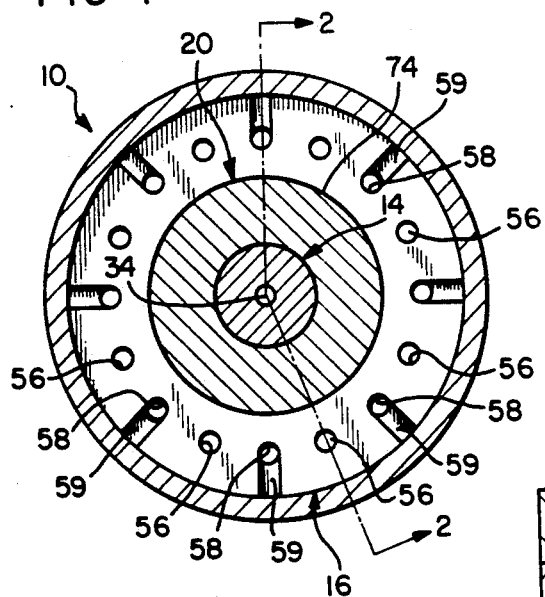
FIG. 1 is a sectional plan view of a preferred embodiment of the shock absorber of the invention taken through the second piston toward the first piston along the lines 1—1 of FIG. 2.
Figure 5:
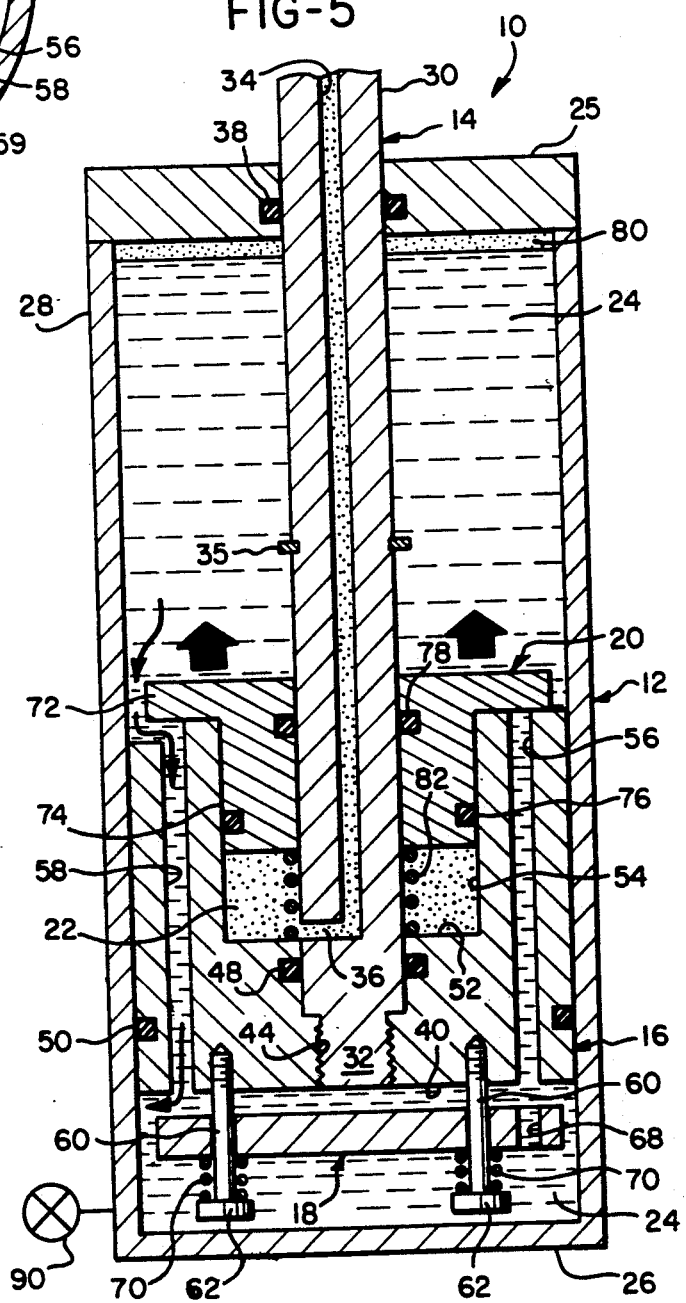
FIG. 5 is a sectional elevational view of the shock absorber of FIG. 2 shown at the commencement of an upward stroke.

The drawings illustrate a shock absorber 10 constructed according to the invention. The shock absorber 10 is comprised of a tubular cylinder 12, a piston rod 14, a cylinder closure plate 25, a first piston 16, a return passageway closure plate 18 and a second piston 20. The shock absorber 10 also includes a compressible fluid in a cavity 22 and an incompressible fluid indicated generally at 24. The compressible fluid is preferably air and the incompressible fluid 24 is preferably hydraulic fluid of the type utilized in conventional shock absorbers.

The tubular cylinder 12 is hollow and has one completely closed or blind end 26 and an opposite end 28. The interior wall surface of the cylinder 12 is indicated at 29. The piston rod 14 has a free end 30 protruding from the opposite end 28 of the cylinder 12 and an opposite externally threaded piston coupling end 32. The piston coupling end 32 of the piston rod 14 resides within the confines of the tubular cylinder 12. The piston rod 14 is formed with an axial longitudinal passage 34 that extends the greater part of its length from the free end 30 to a termination proximate the piston coupling end 32. A transverse passageway 36 extends radially outwardly from the termination of the longitudinal passageway 34 proximate the piston coupling end 32 to a port on the cylindrical surface of the piston rod 14. The piston rod 14 is also provided with an annular, radially projecting limiting ring 35 seated in a radial annular channel in the outer surface of the piston rod 14. The limiting ring 35 limits movement of the second piston 20 relative to the piston rod 14.

An annular cylinder closure member 25 is disposed and sealed across the opposite end 28 of the cylinder 12. The closure member 25 has a central axial cylindrical opening to receive the piston rod 14. Within the wall of the opening there is an annular recess in which a rubber O-ring 38 is seated. The O-ring 38 enables the annular closure member 25 to establish a sliding, fluid tight seal with the surface of the piston rod 14.

The first piston 16 has opposite transverse faces 40 and 42. The transverse circular face 40 is directed toward the blind end 26 of the cylinder 12, and the other annular face 42 is directed toward the opposite end 28 of the cylinder 12. The first piston 16 has a central, axial, internally tapped opening 44 proximate the face 40 thereof. The piston coupling end 32 of the piston rod 14 is secured in threaded engagement with the tapped opening 44 in the first piston 16. Above the tapped opening 44 there is a radial channel defined within the first piston 16 in which another O-ring 48 is seated. The O-ring 48 forms a fixed, fluid tight seal between the lower end of the piston rod 14 and the lower region of the first piston 16.

Above the O-ring 48 and defined within the first piston 16 there is a concave well having an annular floor 52 and an inwardly facing cylindrical wall 54. The well is defined radially within the transverse face 42 that is directed toward the opposite end 28 of the cylinder 12.

The outer cylindrical wall of the first piston 16 is of cylindrical configuration with an internally directed radial channel defined therein. An O-ring 50 is seated in the radial channel in the outer wall of the first piston 16 so that the first piston 16 moves in sliding, fluid tight sealed engagement against the cylinder wall 29 within the cylinder 12.

Spaced uniformly about the axis of the first piston 16 are a plurality of separate longitudinally extending dampening passageways 56 that extend between ports or orifices in the opposite transverse faces 40 and 42 of the first piston 16. Uniformally spaced between the dampening passageways 56 there are a plurality of return passageways 58 that likewise extend between the opposite transverse faces 40 and 42 of the first piston 16. As illustrated in FIG. 1, radial grooves 59 are defined in the upper transverse face 42. The grooves 59 extend radially outwardly from each of the return passageways 58 to the outer, cylindrical wall of the first piston 16.

The return passage closure plate 18 is a disc-shaped plate disposed proximate the lower transverse face 40 of the first piston 16. The perimeter of the disc-shaped return passage closure plate 18 extends beyond both the dampening passageways 56 and the return passageways 58, but does not reach the cylinder wall 29. The return passage closure plate 18 is mounted on the first piston 16 by means of a plurality of longitudinally extending guide posts 60. The guideposts 60 have enlarged heads 62 at their lower extremities and are externally threaded at the opposite ends of their shanks for securement in threaded engagement in corresponding internally tapped recesses in the face 40 of the first piston 16. The return passage closure plate 18 is thereby restrained from rotation relative to the first piston 16, but is movable in longitudinally reciprocal fashion relative thereto.

Figure 2:
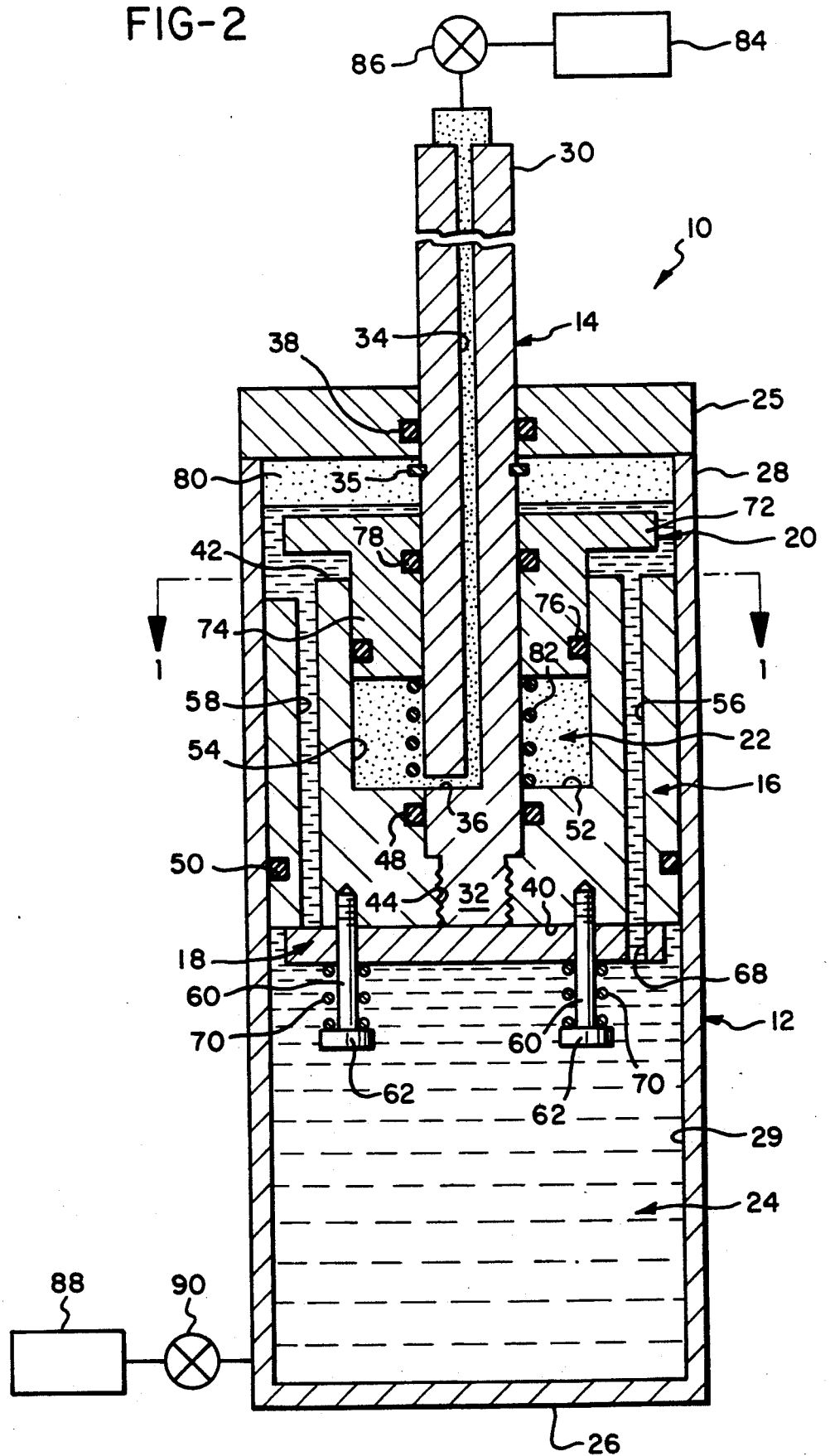
FIG. 2 is a sectional elevational view of the shock absorber of the invention taken along the lines 2—2 of FIG. 1 and showing the shock absorber at the commencement of a downward stroke.
Figure 3:
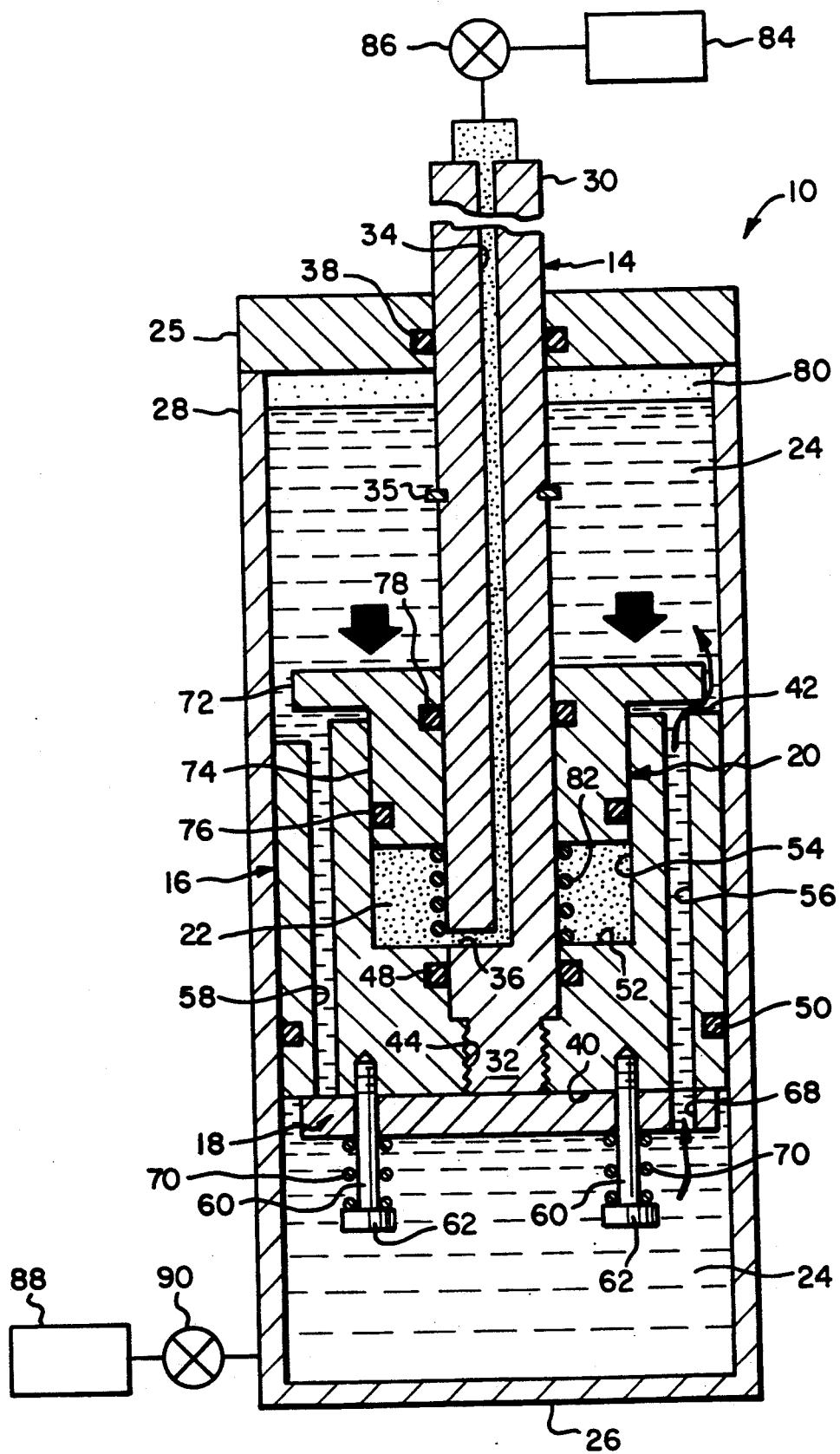
FIG. 3 is a sectional elevational view of the shock absorber of FIG. 2 shown at an intermediate stage of a downward stroke.
Figure 4:
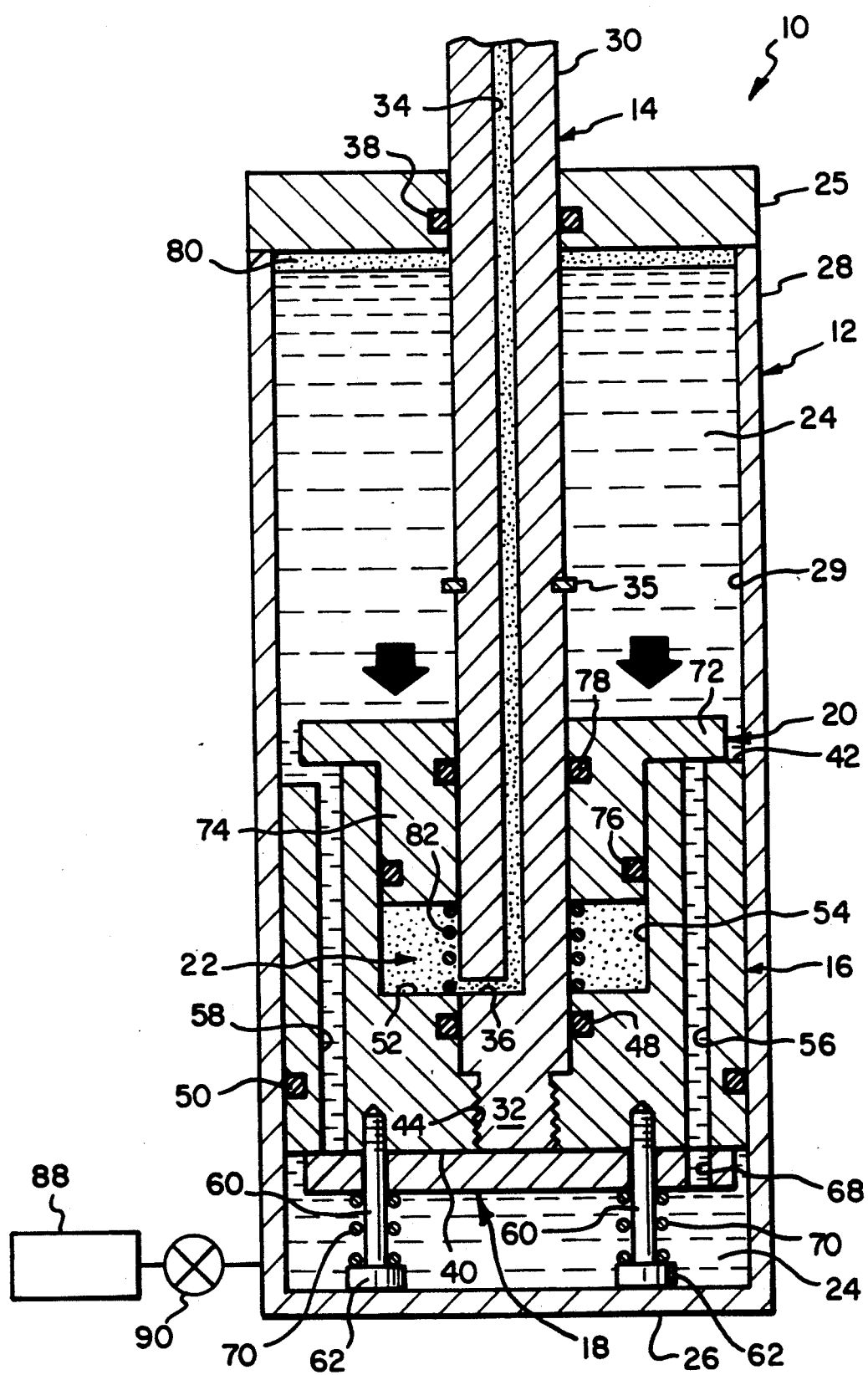
FIG. 4 is a sectional elevational view of the shock absorber of FIG. 2 shown at the bottom of a downward stroke.

The return passage closure plate 18 has a plurality of longitudinal openings 68 therethrough which are located in registration with each of the dampening passageways 56. The return passage closure plate 18 thereby does not in any way restrict flow through the dampening passageways 56 at any time. However, it does alternatively block and unblock the return passageways 58. It blocks them when disposed in contact with the transverse face 40 of the first piston 16, as depicted in FIGS. 2-4. Alternatively, the return passage closure plate 18 is longitudinally movable along the shanks of the guide pins 60 to allow flow through the return passageways 58 and past the outer periphery of the return passage closure plate 18. The external diameter of the return passageway closure plate 18 is smaller than the internal diameter of the internal wall 29 of the cylinder 12.

A compressed coiled spring 70 is disposed about each of the shanks of each of the guide pins 60. The coiled springs 70 are compressed between the heads 62 of the guide pins 60 and the surface of the return passage closure plate 18 that faces the blind end 26 of the tubular cylinder 12. The coil springs 70 thereby serve as a means for biasing the return passage closure plate 18 to block the return passages 58, as illustrated in FIGS. 2-4.

The second piston 20 is a cylindrical annular structure which has a marginal flange 72 extending radially outwardly at its upper extremity facing the end 28 of the tubular cylinder 12. The second piston 20 also has a cylindrical annular core 74 that extends down into the well defined in the first piston 16. A radially inwardly directed channel is defined in the outer surface near the lower end of the core 74 of the second piston 20 to receive a rubber O-ring 76. The second piston 20 also has a cylindrical axial opening defined therewithin to receive the piston rod 14. A radially outwardly directed channel is defined in the inner wall of the core 74 at the central axial opening of the second piston 20 to receive another rubber O-ring 78 therewithin. The second piston 20 is thereby mounted in the concave well defined in the first piston 16 with sliding, fluid tight seals formed by the O-rings 76 and 78, against both the first piston 16 and the piston rod 14 for longitudinal movement relative thereto.

The second piston 20 can be moved longitudinally relative to the first piston 16 to alternatively block and unblock the dampening passageways 56. FIG. 4 illustrates the second piston 20 in a condition forced deep into the first piston 16 such that the flange 72 of the second piston 20 seats upon the upper face 42 of the first piston 16. As a result, the flange 72 of the second piston 20 blocks the dampening passageways 56 when the first and second pistons 16 and 20 are in the relative positions depicted in FIG. 4. Alternatively, the second piston 20 maybe moved further out of the well defined in the first piston 16 to unblock the dampening passageways 56, as illustrated in FIGS. 2 and 3. FIG. 2 illustrates the second piston 20 withdrawn sufficiently from the first piston 16 to fully unblock the dampening passageways 56.

Due to the relative movement between the first and second pistons 16 and 20, the annular cavity 22 defined between the core 74 of the second piston 20 and the well defined within the first piston 16 has a variable volume. A compressible fluid, preferably air, is located in the annular cavity 22 between the first and second pistons 16 and 20. To enhance the dampening effects of the shock absorber 10, air may also be located in the cylinder 12 adjacent the cylinder closure plate 25 in the cavity indicated at 80 where the piston rod 14 emanates from the end 28 of the tubular cylinder 12. With the exception of the portions of the enclosure within the tubular cylinder 12 occupied by the operating components of the structure and the variable volume cavities 22 and 80 that contain compressible fluid, the remaining volume of the tubular cylinder 12 is occupied by the incompressible hydraulic fluid 24.

A compressed coil spring 82 is also located within the variable volume cavity 22 and bears longitudinally against the downwardly facing surface of the core 74 of the second piston 20 and the floor 52 of the well defined in the first piston 16. The spring 82 thereby serves to aid in overcoming friction during the return stroke of the shock absorber 10. Also the spring 82 may be used to aid the force of the compressible fluid where there is a space limitation on the size of the compressible fluid cavity 22.

Although the shock absorber 10 may be entirely self contained, provision may be made for external control of the dampening characteristics thereof. To this end a compressible fluid reservoir 84, depicted diagrammatically in FIGS. 2 and 3 provided. The compressible fluid reservoir 84 contains air under a pressure greater than the maximum pressure in the compressible fluid cavities 22 and 80 in the shock absorber 10. The air pressure reservoir 84 is connected in communication with the cavity 22 of variable volume between the first and second pistons 16 and 20 by means of a pressure regulating valve 86 that is interposed between the reservoir 84 and the longitudinal passage 34 through the piston rod 14. The pressure regulating valve 86 is a three way valve and may be moved to a closed position, thereby isolating the cavity 22 within the cylinder 12, to an open position in communication with the reservoir 84, and to a third position in which the variable volume cavity 22 is vented to the lower ambient pressure of the surrounding atmosphere.

By turning the valve 86 so that the reservoir 84 is in communication with the variable volume cavity 22, additional air under pressure can be injected into the cavity 22, to create changes in the dampening characteristics of the shock absorber 10. Conversely, manipulation of the valve 86 to vent the variable volume cavity 22 to atmosphere will allow air to flow from the cavity 22, thereby reversing those changes in the dampening characteristics of the shock absorber 10. In a neutral or isolated condition the valve 86 allows the dampening characteristics of the shock absorber 10 to be entirely internally controlled. Operation of the valve 86 may either be performed manually, or under automated control depending upon different predetermined and selected parameters.

External control of the dampening characteristics may also be provided by means of an incompressible fluid reservoir 88 connected in communication with the interior of the tubular cylinder 12 through a pressure regulating valve 90, as illustrated diagrammatically in FIGS. 2, 3 and 4. A pressure regulating valve 90 is interposed between the incompressible fluid reservoir 88 and the interior of the tubular cylinder 12, and operates in precisely the same manner as the pressure regulating valve 86. Hydraulic fluid is naturally not vented to the atmosphere, but rather to a low pressure hydraulic reservoir (not shown).

The operation of the shock absorber 10 may be described with reference to the sequential movements of the operating elements depicted in FIGS. 2-5. FIG. 2 illustrates the piston rod 14 fully retracted from the cylinder 12 such that the first and second pistons 16 and 20 approach the end 28 of the tubular cylinder 12. Since most of the piston rod 14 is withdrawn from the cylinder 12, only a relatively small volume of the piston rod 14 remains within the cylinder 12. As a consequence, a greater volume within the cylinder 12 is available for expansion of the compressible air in the cavities 22 and 80. The expansion of the air in these cavities provides the shock absorber 10 with initial relatively low dampening characteristics. Thus, when the vehicle negotiates a corner or receives an impact the first piston 16 commences movement toward the blind end 26 of the cylinder 12 at a relatively rapid rate.

As the piston 16 progresses in its movement from the position of FIG. 2 to the position of FIG. 3, the incompressible fluid 24 flows from the bottom of the cylinder 12 in the region near the blind end 26 upwardly into the dampening passage orifices and through the dampening passageways 56 and into the upper region of the cylinder 12 proximate the opposite end 28. However, as the cylinder 16 progresses in this movement toward the blind end 26, an ever increasing length of the piston rod 14 enters the cylinder 12. As the length of the portion of the piston rod 14 within the tubular cylinder 12 increases, the volume within the cylinder 12 occupied by the increasing portion of the piston rod 14 within the cylinder 12 likewise increases as a product of the area of the piston rod 14 multiplied by the length of the portion of the piston rod 14 within the cylinder 12. This reduces the overall volume within the cylinder 12 that is available for occupancy by the incompressible hydraulic fluid 24 and the compressed air in the cavities 22 and 80.

Since the only substance in the cylinder 12 which can contract in volume to accommodate the increasing volume of the piston rod 14 within the cylinder 12 is the air in the cavities 22 and 80, the volumes of both of these cavities diminish as the first piston 16 approaches the blind end 26 of the cylinder 12. Since the pressure within the incompressible fluid 24 is equal throughout the volume which it occupies, not only is the volume of the cavity 80 proximate the cylinder end closure 25 reduced, but the core 74 of the second piston 20 is forced further into the well defined in the first piston 16. This compresses the volume of the variable volume cavity 22 as well. As the first piston 16 progresses downwardly, the return passage closure plate 18 prevents flow of the incompressible fluid through the return passageways 58. Flow of the incompressible fluid 24 is thereby restricted to the dampening passageways 56.

The orifice openings to the dampening passageways 56 are gradually restricted by the flange 72 of the second piston 20 as the first piston 16 moves toward the blind end 26 of the cylinder 12. As the first piston 16 approaches the lowermost limit of its stroke, as depicted in FIG. 4, the flange 72 of the second piston 20 comes into contact with the upper face 42 of the first piston 16 and seals the dampening passageways 56 completely. This cuts off all flow of the incompressible fluid 24 from the region near the blind end 26 to the region near the opposite end 28 of the cylinder 12. The first piston 16 can thereupon move no further toward the blind end 26. The first piston 16 is thereby at its closest approach to the blind end 26, and the dampening characteristics are greatest when the shock absorber 10 is in the condition depicted in FIG. 4.

At this point, at the cessation of a downward force on the piston rod 14, an external spring in the vehicle (not shown) tends to pull the piston rod 14 out of the cylinder 12. This creates an excessive pressure within the upper region of the cylinder 12. As a consequence, the pressure within this region, acting through the grooves 59 and the relief passageways 58, overcomes the bias of the springs 70 and pushes the relief passage closure plate 18 away from the face 40 of the first piston 16. Incompressible hydraulic fluid flow can therefore flow from the upper cylinder portion back into the lower portion of the cylinder 12 through the relief passageways 58. When this occurs the first piston 16 begins to move away from the blind end 26 of the cylinder 12. With this movement the length of the piston rod 14 residing within the confines of cylinder 12 decreases somewhat, thereby providing an additional volume for expansion of the air within the variable volume cavities 22 and 80. Expansion of the air within the cavity 22 pushes the core 74 of the second piston 20 upwardly slightly, thereby unseating the flange 72 from atop the upper face 42 of the first piston 16. The incompressible hydraulic fluid thereupon commences to flow through the dampening passageways 56 from the upper portion of the cylinder 12 near the opposite end 28 toward the lower portion near the blind end 26.

At the commencement of the return stroke of the first piston 16, the pressure of the incompressible fluid 24 very shortly reaches equilibrium above and below the first piston 16. The springs 70 thereupon return the relief passage closure plate 18 into contact with the face 40 of the first piston 16. This blocks off further flow through the relief passageways 58. However, since the flange 72 has by this time been unseated from contact with the face 42 of the first piston 16, incompressible fluid can flow back down through the dampening passageways 56 from the region of the cylinder 12 proximate the end 28 toward the blind end 26 thereof. As the piston rod is pushed out of the cylinder 12 through the cylinder closure plate 25, the continued reduction in the length of the piston rod 14 within the cylinder 12 leads to further expansion of the compressed air within the cavities 22 and 80. This reduces the overall pressure within the system and increases the dampening characteristics. Ultimately, the first piston 16 will return to the position at the upper extremity of its stroke, which is depicted in FIG. 2.

The flow of the incompressible fluid and the expansion and compression of the compressible fluid can be entirely self contained, as described. If desired, however, the dampening characteristics may be increased by either or both of the reservoirs 84 and 88 to the interior of the cylinder 12, as previously described. Conversely, the dampening characteristics of the shock absorber 10 may be controlled externally by venting either or both of the compressible and incompressible fluids through the valves 86 and 90, respectively, as previously described.

Undoubtedly, numerous variations and modification of the invention will become readily apparent to those familiar with shock absorbers. For example, it is to be understood that the dampening effect need not necessarily be progressive with the stroke of the piston. In fact a shock absorber could be constructed wherein the dampening effect is regressive. It is a characteristic of the invention that the cavities for the compressive fluid control the dampening characteristics, of the shock absorber whatever they may be.

Also, it is possible to substitute incompressible fluid for the compressible fluid in the cavity 22 when a piston rod 14 having an axial passage 34 and a reservoir 84 are employed. In this case the cylinder would have to either have compressible fluid in the cavity 80 or the cylinder 12 would have to be coupled to the reservoir 88, or perhaps both. Accordingly, the scope of the invention should not be construed as limited to the specific embodiment of the invention depicted and described, but rather is defined in the claims appended hereto.

I claim:

1. A shock absorber comprising:
   a tubular cylinder having a blind end and an opposite end,
   a piston rod disposed coaxially within said cylinder so that a portion thereof occupies space within said cylinder and a portion thereon protrudes axially from said opposite end of said cylinder,
   a first piston secured to said piston rod within said cylinder and movable in longitudinal reciprocation in sliding, fluid tight sealed engagement against said cylinder, said first piston defining separate dampening passageway means and return passageway means extending longitudinally therethrough, said first piston and said piston rod defining therebetween an annular well facing said opposite end of said cylinder;
   return passage closure means mounted on said first piston to alternatively block and unblock said return passageway means,
   a second piston having an annular configuration mounted for longitudinally reciprocation in said well in sliding, fluid tight sealed engagement with both said piston rod and said first piston to positions alternatively blocking said dampening passageway means as said first piston approaches said blind end of said cylinder and unblocking said dampening passageway means as said first piston withdraws from said blind end of said cylinder, said first and second pistons together defining at least one cavity of variable volume including a cavity therebetween that varies in volume inversely with the volume of said portion of said piston rod occupying space within said cylinder, an annular end closure means disposed across said opposite end of said cylinder and having a central opening with a seal to receive said piston rod in sliding, fluid tight sealed engagement therewith, a compressible fluid located in said space elsewhere in said cylinder of variable volume and which is compressed therewithin when said first piston moves toward said blind end of said cylinder and which expands as said first piston moves toward said opposite end of said cylinder, and an incompressible fluid occupying space elsewhere in said cylinder.

2. A shock absorber according to claim 1 further characterized in that said piston rod defines a longitudinal passageway therewithin with an opening therefrom in communication with said cavity of variable volume defined between said pistons, and further comprising a compressible fluid reservoir external to said cylinder in communication with said longitudinal passageway in said piston rod, and pressure regulating means between said longitudinal passage in said piston rod and said compressible fluid reservoir.

3. A shock absorber according to claim 1 further comprising a spring in said cavity of variable volume arranged to bias said pistons longitudinally apart.

4. A shock absorber according to claim 1 wherein said return passage closure means is formed as a plate disposed across said first piston between said first piston and said blind end of said cylinder and is mounted thereon by longitudinally extending guideposts, wherein said plate has openings therethrough in registration with said dampening passageway means, and said plate is longitudinally reciprocal relative to said first piston.

5. A shock absorber according to claim 4 further comprising spring biasing means for urging said return passage closure means toward said first piston to block said return passageway means.

6. A shock absorber according to claim 1 further comprising an incompressible fluid reservoir located external to said cylinder and coupled in communication with the interior of said cylinder.

7. A shock absorber comprising:
a tubular cylinder having one blind end and an opposite end,
a piston rod having a free end protruding from said opposite end of said cylinder and a piston coupling end which resides within said cylinder, whereby a portion of said rod occupies a volume of space within said cylinder,
an annular cylinder closure means disposed across said opposite end of said cylinder and which establishes a sliding, fluid tight seal with said piston rod,
a first piston having opposite transverse faces respectively directed toward said blind end and said opposite end of said cylinder, wherein said first piston is secured to said piston coupling end of said piston rod and moves in sliding, fluid tight sealed engagement within said cylinder, said first piston defining therewithin a concave well in said transverse face directed toward said opposite end of said cylinder, and separate dampening passageway means and return passageway means extending between said opposite transverse faces of said first piston, return passageway closure means mounted on said first piston to alternatively block and unblock said return passageway means, a second piston mounted in said concave well of said first piston with sliding fluid tight seals between said first piston and said piston rod for longitudinal movement relative thereto to alternatively block said dampening passageway means as said first piston approaches said blind end of said cylinder and unblock said dampening passageway means as said first piston withdraws from said blind end of said cylinder, wherein an annular cavity of variable volume is defined between said first and second pistons that varies in volume inversely with the volume of said portion of said piston rod occupying space within said cylinder, a compressible fluid located in said annular cavity of variable volume between said first and second pistons, and which is compressed therewithin when said volume of said annular cavity decreases and which expands therewith when said volume of said annular cavity increases, and an incompressible fluid occupying space elsewhere in said cylinder.

8. A shock absorber according to claim 7 wherein said return passageway closure means includes a longitudinal guide means, a plate mounted by said longitudinal guide means at said transverse face of said first piston that is directed toward said blind end of said cylinder, said plate defining structure longitudinally aligned with said return passageway means and openings longitudinally aligned with said dampening passageway means.

9. A shock absorber according to claim 8 further comprising spring biasing means to urge said plate into contact with said face of said first piston directed toward said blind end of said cylinder.

10. A shock absorber according to claim 7 further comprising a longitudinal passage through said piston rod and in communication with said cavity of variable volume between said first and second pistons, a compressible fluid reservoir, and a pressure regulator interposed between said compressible fluid reservoir and said longitudinal passage through said piston rod.

11. A shock absorber according to claim 7 further comprising an incompressible fluid reservoir in communication with the interior of said tubular cylinder, and a pressure regulating means interposed between said incompressible fluid reservoir and said interior of said tubular cylinder.

12. A shock absorber according to claim 7 further comprising a spring disposed in said cavity of variable volume to urge said first and second pistons apart.

13. A shock absorber comprising a hollow cylinder having an interior wall, a blind end and an opposite end,
a first piston disposed coaxially within said cylinder and longitudinally movable relative thereto and having a seal that slides in fluid tight engagement against said interior wall of said cylinder, said first piston having an annular portion extending toward said opposite end of said cylinder along said interior wall of said cylinder, thereby defining a concave well disposed radially within said first piston, and wherein separate longitudinal dampening passageway means and return passageway means are defined through said annular portion of said first piston, return passage closure means mounted on said first piston for alternatively blocking and unblocking said return passageway means, a second annular piston mounted in said well of said first piston in longitudinally reciprocal, sliding, fluid tight sealed engagement thereagainst and having a flange extending radially outwardly and in longitudinal alignment with said dampening passageway means in said first piston between said annular portion of said first piston and said blind end of said cylinder, whereby a cavity of variable volume is defined between said first and second pistons, and said second piston is movable relative to said first piston to alternatively block said dampening passageway means responsive to approach of said first piston to said blind end of said cylinder and unblock said dampening passageway means responsive to withdrawal of said first piston from said blind end of said cylinder, a piston rod secured to said first piston and extending axially through said second piston with a sliding, fluid tight seal therebetween, and a portion of said piston rod resides within said cylinder and occupies space therewithin and a portion of said piston rod protrudes from said opposite end of said hollow cylinder, an annular cylinder end closure at said opposite end of said cylinder, whereby said piston rod is movable in sliding, fluid tight sealed engagement therewithin, a compressible fluid located in said cavity of variable volume and which is compressed therewithin as said piston rod moves toward said blind end of said cylinder and which expands therewithin as said piston rod is withdrawn from said blind end of said cylinder, and an incompressible fluid disposed within said cylinder.

14. A shock absorber according to claim 13 further comprising a longitudinal compressible fluid passageway within said piston rod in communication with said cavity of variable volume between said first and second pistons, and means for regulating passage of compressible fluid through said compressible fluid passageway.

15. A shock absorber according to claim 13 further comprising means biasing said first and second pistons longitudinally apart.

16. A shock absorber according to claim 13 further comprising means biasing said return passage closure means to block said return passageway means.

17. A shock absorber according to claim 13 further comprising an incompressible fluid reservoir coupled to said hollow cylinder, and means for regulating flow of incompressible fluid between said incompressible fluid reservoir and said hollow cylinder.

* * * * *